(12) United States Patent
Takeda et al.

(10) Patent No.: US 7,927,696 B2
(45) Date of Patent: Apr. 19, 2011

(54) VISIBLE LIGHT ABSORBING FILM, STRUCTURAL MEMBER HAVING THIS VISIBLE LIGHT ABSORBING FILM AND VISIBLE LIGHT ABSORBING INK WHICH FORMS VISIBLE LIGHT ABSORBING FILM

(75) Inventors: Hiromitsu Takeda, Chiba (JP); Kayo Yabuki, Chiba (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 144 days.

(21) Appl. No.: 10/524,417

(22) PCT Filed: Aug. 21, 2002

(86) PCT No.: PCT/JP02/08423
§ 371 (c)(1),
(2), (4) Date: Feb. 14, 2005

(87) PCT Pub. No.: WO2004/019084
PCT Pub. Date: Mar. 4, 2004

(65) Prior Publication Data
US 2005/0238885 A1 Oct. 27, 2005

(51) Int. Cl.
*B32B 5/16* (2006.01)
*B32B 7/02* (2006.01)
*B32B 15/08* (2006.01)

(52) U.S. Cl. ......... 428/328; 428/212; 428/329; 428/458

(58) Field of Classification Search .......... 428/212, 428/323, 328, 329, 426, 432, 458; 106/31.6; 523/160, 161
See application file for complete search history.

(56) References Cited

U.S. PATENT DOCUMENTS

| | | | | |
|---|---|---|---|---|
| 4,022,947 A | * | 5/1977 | Grubb et al. | 428/432 |
| 4,797,317 A | * | 1/1989 | Oliver et al. | 428/204 |
| 5,275,869 A | * | 1/1994 | Lin | 428/195.1 |
| 5,332,888 A | * | 7/1994 | Tausch et al. | 219/547 |
| 6,472,455 B1 | * | 10/2002 | Bleikolm et al. | 523/160 |
| 6,730,154 B2 | * | 5/2004 | Inoue et al. | 106/31.68 |
| 6,858,306 B1 | * | 2/2005 | Strickler et al. | 428/432 |
| 2001/0009933 A1 | * | 7/2001 | Miyabayashi | 523/160 |

FOREIGN PATENT DOCUMENTS

| | | |
|---|---|---|
| JP | 57-59749 | 4/1982 |
| JP | 3-187739 | 8/1991 |
| JP | 10-182190 | 7/1998 |
| JP | 2000-80319 | 3/2000 |
| JP | 2000-137111 | 5/2000 |
| JP | 2000-238170 | 9/2000 |

OTHER PUBLICATIONS

Machine Translation of Foreign Reference: JP 10-182190 (Jul. 7, 1998) (translated documents imported as JP-10-182190-claims.pdf, JP-10-182190-spec.pdf, and JP-10-182190-abstract.pdf).*

Machine Translation of Foreign Reference: JP 2000-238170 (Sep. 5, 2000) (translated documents imported as JP-2000-238170-claims.pdf, JP-2000-238170-spec.pdf, and JP-2000-238170-abstract.pdf).*

* cited by examiner

*Primary Examiner* — Mark Ruthkosky
*Assistant Examiner* — David J Joy
(74) *Attorney, Agent, or Firm* — Kratz, Quintos & Hanson, LLP

(57) ABSTRACT

The visible light absorbing film according to the present invention is formed by a visible light absorbing ink having been coated on one side or both sides of a substrate which has solar radiation reflecting properties and whose visible light reflectance is 10% or more, and is characterized in that the degree of reduction of visible light reflectance is 0.9 or less as defined by degree of reduction of visible light reflectance= [visible light reflectance (%) after coating of the ink]/[visible light reflectance (%) before coating of the ink], and the degree of reduction of solar radiation reflectance is 0.25 or more as defined by degree of reduction of solar radiation reflectance= [solar radiation reflectance (%) after coating of the ink]/[solar radiation reflectance (%) before coating of the ink].

5 Claims, No Drawings

VISIBLE LIGHT ABSORBING FILM, STRUCTURAL MEMBER HAVING THIS VISIBLE LIGHT ABSORBING FILM AND VISIBLE LIGHT ABSORBING INK WHICH FORMS VISIBLE LIGHT ABSORBING FILM

TECHNICAL FIELD

This invention relates to a visible light absorbing film, a structural member having this visible light absorbing film, and a visible light absorbing ink which forms the visible light absorbing film. It relates to a visible light absorbing film which is formed, e.g., on a transparent film having metallic luster on the surface of which film a metallic thin film has been formed or on a semitransparent substrate made of glass or the like so as to enable restraint of glaringness in the visible region and also enables the above substrate to maintain even its heat insulating properties, a structural member having this visible light absorbing film, and a visible light absorbing ink which forms the visible light absorbing film.

BACKGROUND ART

Glass, transparent films and so forth on which shielding films have been formed by coating, sputtering or the like method are conventionally used for the purpose of shielding the sunlight that enters through window materials of constructions, window materials of automobiles, and so forth.

These shielding films are roughly grouped into a heat ray reflection type and a heat ray absorption type.

More specifically, many of the heat ray reflection type are metallic thin films of Al, gold or the like formed on transparent substrates such as glass and transparent films by sputtering, ion plating, vacuum deposition or the like method, as disclosed in, e.g., Japanese Patent Application Laid-open No. S57-59749. Such metallic thin films reflect light having wavelengths ranging from the visible region up to the infrared region, and hence can make the substrate less rise in temperature and have very good heat insulating properties. Since, however, they also reflect light having wavelengths in the visible region, they have had a disadvantage that they are so glaring as to look like mirrors and are unfavorable in view of design quality.

On the other hand, in the heat ray absorption type, substrates are coated with, or kneaded therein with, such organic dyes or organic pigments as those disclosed in Japanese Patent Application Laid-open No. 2000-80319, to color the substrates so as to shield the heat rays. Shielding films of this type are widely prevailing especially because the dyes are inexpensive and are easy to handle, but are disadvantageous in that they have poor weatherability. Also, shielding films of this type can be free of any glaringness due to the reflection in the visible region and have superior design quality, but have had a disadvantage that they have lower heat insulating efficiency than those of the heat ray reflection type because the former inevitably allows the heat energy absorbed in the substrates, to radiate into the interior. Still also, shielding films making use of the above organic dyes or organic pigments, or coloring materials such as oxides, sulfides or sulfates of metals, have had no properties that may achieve both high shielding properties and restraint of glaringness. Furthermore, they have had a problem that, because of use of coloring materials, they have so excessively bright color tone in many cases as to come into depthless or reposeless appearance.

The present invention has been made taking note of such problems. Accordingly, a subject of the present invention is to provide a visible light absorbing film which enables restraint of glaringness in the visible region in the heat ray reflection type one and also enables substrates to maintain even their heat insulating properties, and to provide a structural member having this visible light absorbing film, and a visible light absorbing ink which forms the visible light absorbing film.

Then, the present inventors have made extensive studies in order to settle the above subject. As the result, they have come up with a discovery that, where a visible light absorbing film is formed on at least one side of a substrate having solar radiation reflecting properties, using a visible light absorbing ink containing fine particles which may selectively absorb the visible-region light and transmit the near-infrared-region light and infrared-region light, only the visible-region light can selectively be absorbed as the substrate is kept to have its solar radiation reflecting properties, in virtue of the action of the visible light absorbing film formed. The present invention has been accomplished on the basis of such a technical finding.

DISCLOSURE OF THE INVENTION

More specifically, the visible light absorbing film according to the present invention is formed by a visible light absorbing ink having been coated on one side or both sides of a substrate which has solar radiation reflecting properties and whose visible light reflectance is 10% or more, and is characterized in that:

the degree of reduction of visible light reflectance is 0.9 or less as defined by degree of reduction of visible light reflectance=[visible light reflectance (%) after coating of the ink]/[visible light reflectance (%) before coating of the ink]; and the degree of reduction of solar radiation reflectance is 0.25 or more as defined by degree of reduction of solar radiation reflectance=[solar radiation reflectance (%) after coating of the ink]/[solar radiation reflectance (%) before coating of the ink].

According to the visible light absorbing film according to the present invention, having been formed on one side or both sides of the substrate, its degree of reduction of visible light reflectance of the film is 0.9 or less, and this reduces the reflection of visible light from the substrate to enable restraint of glaringness in the visible region. Also, its degree of reduction of solar radiation reflectance is 0.25 or more, and this retains the reflection of solar radiation from the substrate to enable the substrate to maintain even its heat insulating properties.

Here, as the substrate, any desired material may be used as long as it has solar radiation reflecting properties and has a visible light reflectance of 10% or more, and may be exemplified by films, glass sheets, transparent resin sheets and so forth having such reflection characteristics alone, films, glass sheets, transparent resin sheets and so forth on which metallic thin films have been formed, and composite members obtained by laminating the films, glass sheets, transparent resin sheets and so forth on which metallic thin films have been formed, to different films, glass sheets, transparent resin sheets and so forth.

In order that the substrate can maintain its clear translucency after the visible light absorbing film has been formed thereon, it is also preferable that, as a haze value measured according to JIS K 7105, the substrate on which the visible light absorbing film has been formed has a haze value which has been made lower than the haze value before formation of the visible light absorbing film, or that the substrate on which the visible light absorbing film has been formed has a haze value which has been made higher than the haze value before formation of the visible light absorbing film and its gain is +3% or less.

In order that the visible light absorbing film having been formed has not so excessively bright color tone as to come into a depthless or reposeless state, it is further preferable that, as chromaticness $c^*=[(a^*)^2+(b^*)^2]^{1/2}$ in the L*a*b* color system, the visible light absorbing film has a value of 40 or less.

The structural member having the visible light absorbing film according to the present invention is characterized in that a laminate formed by providing the above visible light absorbing film on one side or both sides of a substrate which has solar radiation reflecting properties and whose visible light reflectance is 10% or more; the laminate being incorporated directly or via an intervenient member or via a space.

The visible light absorbing ink according to the present invention is characterized by containing at least one fine particles of a compound oxide selected from the group consisting of Cu—Fe—Mn, Cu—Cr, Cu—Cr—Mn, Cu—Cr—Mn—Ni, Cu—Cr—Fe and Co—Cr—Fe, titanium black, titanium nitride, titanium oxynitride, a dark-colored azo pigment, a perylene black pigment, an aniline black pigment and carbon black; the fine particles having an average dispersed-particle diameter of 300 nm or less in the ink.

BEST MODES FOR PRACTICING THE INVENTION

The present invention is described below more specifically and in detail.

First, the present invention makes use of a substrate having reflection in the visible region or a substrate having metallic luster in the visible region. The visible light absorbing ink is coated on at least one side of this substrate to form the visible light absorbing film, thereby aiming at prevention of the glaringness in the visible region, which is a disadvantage the substrate has. Further, in order not to damage the heat insulating properties of the substrate as far as possible, a material is selected which may selectively absorb light perceivable by the human eye, in particular, visible light having wavelengths in the region of from 380 nm to 780 nm, and may transmit light having wavelengths in the near infrared region and infrared region (780 nm or more). This material is made into an ink, which is coated on one side or both sides of a heat ray reflection type substrate (i.e., the substrate having solar radiation reflecting properties and having a visible light reflectance of 10% or more) to form the visible light absorbing film so as to enable constitution having less glaringness in the visible region and having higher heat insulating efficiency than the heat ray absorption type.

More specifically, a heat ray reflection type heat insulating material according to the present invention is one obtained by, e.g., coating the visible light absorbing ink on one side or both sides of a metal vacuum-deposited substrate having the above reflection characteristics. The surface vacuum-deposited thereon with a metal causes reflection due to its plasmons. Hence, it shows reflection characteristics over a wide range of from the ultraviolet region to the visible and infrared regions. Where the visible light absorbing ink is coated on the surface of this substrate, only light components in the visible region which have been reflected on the surface vacuum-deposited with a metal are absorbed in the visible light absorbing film formed of the visible light absorbing ink, and hence the surface has no longer the glaringness looking like that of mirrors. As for the light in the near infrared region and infrared region, it is transmitted through the visible light absorbing film and is sufficiently reflected at the film surface vacuum-deposited with a metal. Hence, it is consequently possible to maintain the high heat insulating properties the substrate has.

For example, where the visible light absorbing film is formed by coating the visible light absorbing ink on one side of a semitransparent substrate vacuum-deposited with a metal, the semitransparent substrate may be placed with its visible light absorbing film side outdoors. Thus, the visible light absorbing film absorbs visible light, and hence there can be no unpleasant feeling due to glaringness on the outdoor side. Also, infrared rays coming from the outdoor side are transmitted through the visible light absorbing film and reflected at the metal vacuum-deposited surface, and hence the heat insulating properties can be kept high. Further, where the visible light absorbing film is placed on the indoor side, the inside of a room can be kept from being mirrored in. On the outdoor side, the outdoor heat energy is reflected by the reflection taking place at the metal vacuum-deposited surface, and hence the heat insulating properties of the semitransparent substrate vacuum-deposited with a metal can be kept high. The visible light absorbing film may also be formed on both sides of the semitransparent substrate vacuum-deposited with a metal.

Since the visible light absorbing film having been formed may have so excessively bright color tone as to come into a depthless br reposeless state, its chromaticness $c^*=[(a^*)^2+(b^*)^2]^{1/2}$ in the L*a*b* color system should be set a little lower, and may preferably be 40 or less. This is because, if the chromaticness c* is more than 40, the visible light absorbing film may have a hue which is so highly bright as to come into reposeless appearance. That is, where the chromaticness c* is 40 or less, the visible light absorbing film can have a pale and dull hue, and can have appearance with depth and repose.

As to the material used in the visible light absorbing ink according to the present invention and capable of selectively absorbing the visible-region light, it may include the following substances.

For example, as an inorganic material, it may include a compound oxide selected from the group consisting of a Cu—Fe—Mn type, a Cu—Cr type, a Cu—Cr—Mn type, a Cu—Cr—Mn—Ni type, a Cu—Cr—Fe and a Co—Cr—Fe type, titanium oxynitride, titanium nitride, lower-oxidized titanium oxide (titanium black) and carbon black. These materials have superior weatherability compared with the following organic pigments.

As an organic pigment, the material may also include dark-colored azo pigments, perylene black and aniline black. These have superior weatherability compared with organic dyes. These materials also little absorb light of 780 nm or more in wavelength and transmit the same, and hence the visible light absorbing film in which any of these materials is used can effectively transmits the light of 780 nm or more in wavelength to effectively utilize metallic reflection of the light of 780 nm or more in wavelength. Then, it has been ascertained that such a visible light absorbing film has a better transmittance for the light of 780 nm or more in wavelength than a case in which the inorganic material is used, and hence has superior heat insulating properties when the visible light absorbing film is formed on the metal vacuum-deposited surface.

As to average dispersed-particle diameter the fine particles of any of these materials may have when dispersed in a liquid to make up the visible light absorbing ink, it may preferably be 300 nm or less, and more preferably be 100 nm or less. This is because fine particles of more than 300 nm or agglomerated particles having formed upon agglomeration may cause scattering of the light having wavelengths in the visible region, in the visible light absorbing film having been formed by coating, and can not provide the visible light absorbing film with any clear translucence to make the film look misty, where the haze value measured according to JIS K 7105 may come higher than the haze value of the substrate before coating and its gain may come to +3% or more (for example, where the haze value of the substrate before coating is a %, the haze value of the substrate after coating is a %+3% or more). A problem may also arise such that no sharp color development is achievable. Another problem may further arise such that, if the fine particles have an average dispersed-particle diameter of more than 300 nm, the fine particles themselves may so strongly agglomerate as to cause, e.g., the settling of fine particles. Incidentally, the average dispersed-particle diameter of the fine particles indicates an average value of fine-particle particle diameters determined by means of an electrophoresis light scattering photometer that utilizes the principle of a dynamic light scattering method.

As a method for dispersing the above material, any method may be selected as desired, as long as it is a method by which the fine particles are uniformly dispersed in a solution. For example, available are methods making use of a ball mill, a sand mill, ultrasonic dispersion, a medium agitation mill and the like.

To retain the state that the fine particles of the above material are kept dispersed stably in a liquid is also important in order to retain the transparency required when the fine particles are mixed with a binder and thereafter the visible light absorbing film is formed. Then, as a method for evaluating a dispersion, a standard may be exemplified in which the haze value (measured according to JIS K 7105) of a transparent PET (polyethylene terephthalate) film is 3% or less after a visible light absorbing film has been formed thereon which has been so controlled as to have a visible light transmittance of from 40% to 60%, in respect of the layer thickness of a visible light absorbing film formed by coating on a 25 μm thick transparent PET (polyethylene terephthalate) film a visible light absorbing ink prepared by mixing a binder component in an amount 10 times the weight of the fine particles. If this haze value is more than 3%, the fine particles may be dispersed in a poor state, and the fine particles themselves may so strongly agglomerate as to cause the settling of fine particles. Further, a poor transparency may result when the fine particles are mixed with a binder and thereafter the visible light absorbing film is formed. Accordingly, the haze value of the transparent PET (polyethylene terephthalate) film may preferably be 3% or less after the visible light absorbing film has been formed thereon which has been so controlled as to have a visible light transmittance of from 40% to 60%, in respect of the layer thickness of a visible light absorbing film formed by coating the visible light absorbing ink on a 25 μm thick transparent PET (polyethylene terephthalate) film.

Incidentally, the above numerical value (40% to 60%) of the visible light transmittance in the visible light absorbing film is a numerical value given as an example employed in the method for evaluating a dispersion, and this does not mean that the visible light transmittance of the visible light absorbing film according to the present invention is limited to the range of this numerical value.

In the visible light absorbing film according to the present invention, as described above, the degree of reduction of visible light reflectance is set to 0.9 or less as defined by degree of reduction of visible light reflectance=[visible light reflectance (%) after coating of the ink]/[visible light reflectance (%) before coating of the ink], and the degree of reduction of solar radiation reflectance is set to 0.25 or more as defined by degree of reduction of solar radiation reflectance= [solar radiation reflectance (%) after coating of the ink]/[solar radiation reflectance (%) before coating of the ink]. The reason therefor is that, if the degree of reduction of visible light reflectance is more than 0.9, the visible light absorbing film may insufficiently be effective in reducing the glaringness in the visible region, and also, if the degree of reduction of solar radiation reflectance is less than 0.25, the reflection efficiency for solar radiation heat may come so low as to result in poor heat insulating properties.

As the binder, usable are a ultraviolet curable resin, an electron ray curable resin, a thermoplastic resin, a thermosetting resin and the like. There are no particular limitations on the types of these binders. The binder may also be used in the state it is mixed with the visible light absorbing ink or the fine particles may directly be mixed with the binder to prepare the visible light absorbing ink so that it may properly be used according to its uses and purposes. It may also be used in the state it is mixed with an adhesive with which films and so forth are bonded.

As the substrate, any desired material may be used as long as it has solar radiation reflecting properties and has a visible light reflectance of 10% or more, and may be exemplified by films, glass sheets, transparent resin sheets and so forth having such reflection characteristics alone, films, glass sheets, transparent resin sheets and so forth on which metallic thin films of Al, Ag, Cu or the like have been formed, and composite members obtained by laminating the films, glass sheets, transparent resin sheets and so forth on which metallic thin films have been formed, to different films, glass sheets, transparent resin sheets and so forth.

In the film on which the metallic thin film is to be formed, the transparent substrate may typically include PET film. Any resin films may be selected which are suitable according to use purposes. In general, it is suitable to use clear resins having light transmission properties and less causative of light scattering, which may include, in rough classification, polycarbonate resins, polyacrylate or -methacrylate resins, cyclic olefin resins, saturated polyester resins, polystyrene, polyvinyl chloride and polyvinyl acetate. These transparent resin films may also be those having been subjected to surface treatment aiming at an improvement in integrity to resin binders. As typical methods for such treatment, well known are corona treatment, plasma treatment, flame treatment, primer layer coating treatment and so forth. Also, where these resin films are used for purposes where importance is attached to design quality, substrates may also be used which have beforehand been templated. In order to stick these resin films to glass or the like, those to one sides of which an adhesive and a release film have been laminated may also be used. In this adhesive, the visible light absorbing ink according to the present invention may also be mixed. To this adhesive, an ultraviolet shielding agent may also be added so that films or coating films can be prevented from undergoing ultraviolet deterioration. Such an ultraviolet shielding agent may include benzophenone ultraviolet absorbers and benzotriazole ultraviolet absorbers, as well as $CeO_2$, $TiO_2$ and $ZnO$. A hard coat layer may also be provided at the outermost layer of any of these films, and a film capable of relatively readily softening upon heating with a dryer or the like may also be used as the substrate so that it is convenient for its sticking to curved surfaces like those of rear windows of automobiles.

As a binder used to form a coating film such as the hard coat layer on the resin film, an ultraviolet curable resin is well known in the art. It is typically composed of, as a chief component, a mixture of a photopolymerizable oligomer such as epoxy acrylate, urethane acrylate, polyester acrylate or polyether acrylate and a photopolymerizable monomer such as a monofunctional acrylate or a polyfunctional acrylate, and added thereto a photopolymerization initiator of a benzoin type, an acetophenone type, a thioxanthone type, a peroxide type or the like and a photopolymerization assistant initiator of an amine type, a quinone type or the like. A heat polymerization inhibitor, an adhesion provider, a thixotropy provider, a plasticizer and a non-reactive polymer may further be added. The above fine particles of the visible light absorbing material may also directly be dispersed in the ultraviolet curable resin, or may be mixed with a dispersion of the visible light absorbing material. The same effect is obtainable also when the visible light absorbing ink according to the present invention is mixed in the adhesive as described previously.

Fine particles of $SiO_2$, $TiO_2$, $ZrO_2$, $Al_2O_3$ or MgO may be added to this ultraviolet curable binder to more improve film strength. The same effect is obtainable also when inorganic matter such as $SiO_2$, $TiO_2$, $ZrO_2$, $Al_2O_3$ or MgO is chemically attached to the chief component of the ultraviolet curable resin. The use of a ultraviolet curable-resin with superior properties such as wear resistance as a binder component of the visible light absorbing ink according to the present invention makes it possible to provide the resin film or resin substrate simultaneously with the property to selectively absorb the visible-region light and the wear resistance.

There are no particular limitations on a dispersion medium of the visible light absorbing material (i.e., a solvent of the visible light absorbing ink), which may be selected in conformity with coating conditions, coating environment, synthetic resin binders in inks, metal alkoxides and so forth. For example, usable are water and various kinds of organic solvents such as alcohols, ethers, esters and ketones. Also, as described above, the fine particles of the visible light absorbing material may directly be dispersed in the binder component. For example, where a synthetic resin binder is used, the fine particles may directly be dispersed in the resin so as to make up solvent-free ink composition that is gentle with environment. An acid or an alkali may also optionally be added to adjust the pH. Every kind of surface-active agent, coupling agent and so forth may further be added in order to improve dispersion stability of the visible light absorbing material in the ink.

There are no particular limitations on methods for coating the visible light absorbing ink, and any method may be used as long as it is a method by which the ink can smoothly and thinly uniformly be coated, as exemplified by dipping, flow coating, spray coating, bar coating, spin coating, gravure coating, roll coating, screen printing and blade coating.

In the case when the synthetic resin binder is used, it may be cured according to a curing method for each resin. For example, in the case of the ultraviolet curable resin, an ultraviolet lamp may be selected in conformity with resonance wavelengths of the photopolymerization initiator for each resin and the intended curing rate. As a typical lamp, it may include low-pressure mercury lamps, high-pressure mercury lamps, ultrahigh-pressure mercury lamps, metal halide lamps, pulse xenon lamps, and electrodeless discharge lamps. Also, in the case of the resin binder of an electron ray curable type, which makes use of no photopolymerization initiator, an electron ray irradiator of a scanning type, an electron curtain type or the like may be used to effect curing. Still also, in the case of a heat curable resin, it may be heated at the intended temperature.

Where the visible light absorbing ink according to the present invention is mixed with the binder such as the ultraviolet curable resin and the mixture obtained is coated on the surface of the substrate such as PET film, any desired film constitution may be employed in accordance with purposes or production steps, without any particular limitations. Also, as to the layer thickness of the visible light absorbing film formed using the visible light absorbing ink, which is influenced by the substrate and the properties of the binder resin, even a layer thickness of 1 μm or less is sufficiently effective, and also, in making the layer thickness larger, the properties of the resin and substrate used serve as the standard by which its upper limit is determined.

The present invention is described below in greater detail by giving Examples.

Here, optical measurement in each Example and Comparative Example given below is made according to JIS S 3107 (light source: D65). As the substrate, an Al vacuum-deposited semitransparent PET film (EMI-10, available from MIRA-REED Corporation; PET film thickness: 25 μm) was used, where the visible light absorbing ink was coated on one side or both sides of the PET film and also this was stuck to a 3 mm thick transparent float glass sheet to make optical measurement.

As to reflection measurements shown in Table 1, measurement was made on a case in which light was made incident on the surface of the film stuck and a case in which light was made incident on the glass side. As to the visible light transmittance and solar radiation transmittance, each transmittance was measured on the case in which light was made incident on the film surface.

In Table 1, the degree of reduction of visible light reflectance is a value defined by degree of reduction of visible light reflectance=[visible light reflectance (%) of each Example]/[visible light reflectance according to Comparative Example before coating of the visible light absorbing ink, i.e., 52.1 or 53.4 (%)], and is an index showing the extent to which the visible light reflectance has lowered. The value of 0.9 or less is regarded as being acceptable.

In Table 1, the degree of reduction of solar radiation reflectance is also a value defined by degree of reduction of solar radiation reflectance=[solar radiation reflectance (%) of each Example]/[solar radiation reflectance according to Comparative Example before coating of the visible light absorbing ink, i.e., 55.3 or 51.9 (%)], and is an index showing the extent to which the solar radiation reflectance has lowered. The value of 0.25 or more is regarded as being acceptable. That is, a case of less than 0.25 shows that the solar radiation reflectance has too lowered, and shows that the reflection of light having wavelengths in the near infrared region and infrared region is small in the visible light absorbing film.

The haze value was measured according to JIS K 7105. In Table 2, the level of change in haze value is a value found by subtracting the haze value before coating (the haze value of 3.1 in Comparative Example) from the haze value after coating of the visible light absorbing ink. Then, a minus value shows that the haze has improved after the visible light absorbing ink has been coated.

The chromaticness $c^*=[(a^*)^2+(b^*)^2]^{1/2}$ in the $L^*a^*b^*$ color system was also measured according to JIS Z 8729 (light source: D65). The results are shown in Table 3. Incidentally, a chromaticness c* of 40 or less is regarded as being acceptable.

Example 1

10 parts by weight of a Cu—Fe—Mn compound oxide (trade name: TMB #3550; available from Dainichiseika Color & Chemicals Mfg. Co., Ltd.) as a visible light absorbing material, 3 parts by weight of an ionic surface-active agent for stabilizing dispersion and 80 parts by weight of toluene as a solvent were mixed.

The liquid mixture obtained was subjected to dispersion treatment so as to have a filler average dispersed-particle diameter of 90 nm or less.

To the dispersion obtained, 100 parts by weight of an ultraviolet curable resin (trade name: ADEKA OPTOMER KR-567; available from Asahidenka Kogyo K.K.) and 0.5 part by weight of a silicone type surface-active agent for improving leveling at the time of coating were added, followed by stirring to obtain a coating fluid (i.e., a visible light absorbing ink).

This was coated in the intended layer thickness by means of a bar coater. As a substrate therefor, the above Al vacuum-deposited semitransparent PET film given as Comparative Example was used. This coated PET film was stuck to a glass sheet on the former's surface on the side opposite to the coated surface, and its optical characteristics were measured.

The optical characteristics measured are shown in Tables 1 to 3 below.

Example 2

A sample was prepared in the same manner as in Example 1 except that in place of the above TMB #3550 a dark-colored azo pigment (trade name: CHROMOFINE BLACK A-1103; available from Dainichiseika Color & Chemicals Mfg. Co., Ltd.) was used. Its optical characteristics were also measured.

The optical characteristics measured are shown in Tables 1 to 3 below.

Example 3

The visible light absorbing ink prepared in Example 1 (TMB #3550) was coated on a substrate, the above Al vacuum-deposited semitransparent PET film, and the visible light absorbing ink prepared in Example 2 (CHROMOFINE BLACK A-1103) was coated on the back of this substrate. This coated PET film was stuck to a glass sheet on the former's CHROMOFINE BLACK A-1103 ink surface, and its optical characteristics were measured.

The optical characteristics measured are shown in Tables 1 to 3 below.

Example 4

A sample was prepared in the same manner as in Example 1 except that in place of the above TMB #3550 a perylene type black pigment (trade name: PALIOGEN BLACK L 0086; available from BASF Corp.) was used. Its optical characteristics were also measured.

The optical characteristics measured are shown in Tables 1 to 3 below.

Example 5

A sample was prepared in the same manner as in Example 1 except that in place of the above TMB #3550 an aniline type black pigment (trade name: PALIOTOL BLACK L 0080; available from BASF Corp.) was used. Its optical characteristics were also measured.

The optical characteristics measured are shown in Tables 1 to 3 below.

Example 6

A sample was prepared in the same manner as in Example 1 except that in place of the above TMB #3550 a Cu—Cr—Mn compound oxide (trade name: TMB #3510; available from Dainichiseika Color & Chemicals Mfg. Co., Ltd.) was used. Its optical characteristics were also measured.

The optical characteristics measured are shown in Tables 1 to 3 below.

Example 7

A sample was prepared in the same manner as in Example 1 except that in place of the above TMB #3550 titanium black (trade name: TILACK-D; available from Ako Kasei Co., Ltd.) was used. Its optical characteristics were also measured.

The optical characteristics measured are shown in Tables 1 to 3 below.

Example 8

A sample was prepared in the same manner as in Example 1 except that in place of the above TMB #3550 titanium nitride was used. Its optical characteristics were also measured.

The optical characteristics measured are shown in Tables 1 to 3 below.

Example 9

A sample was prepared in the same manner as in Example 1 except that in place of the above TMB #3550 titanium oxynitride was used. Its optical characteristics were also measured.

The optical characteristics measured are shown in Tables 1 to 3 below.

Example 10

A sample was prepared in the same manner as in Example 1 except that in place of the above TMB #3550 carbon black (trade name: CARBON BLACK #2650; available from Tokai Carbon Co., Ltd.) was used. Its optical characteristics were also measured.

The optical characteristics measured are shown in Tables 1 to 3 below.

Example 11

A sample was prepared in the same manner as in Example 1 except that in place of the above TMB #3550 a colored pigment (trade name: S0084; available from BASF Corp.) was used. Its optical characteristics were also measured.

The optical characteristics measured are shown in Tables 1 to 3 below.

Comparative Example

On a 25 μm thick transparent PET film, Al was vacuum-deposited to prepare a transparent film having metallic luster (i.e., the above Al vacuum-deposited semitransparent PET film). Its optical characteristics are shown in Tables 1 to 3 below.

TABLE 1

| Incident on: | Visible light transmittance (%) | Solar radiation transmittance (%) | Visible light reflectance (%) | Solar radiation reflectance (%) | Degree of reduction of: Visible light reflectance | Degree of reduction of: Solar radiation reflectance |
|---|---|---|---|---|---|---|
| Comparative Example: | | | | | | |
| F.surf. | 19.2 | 15.5 | 52.1 | 55.3 | — | — |
| G.surf. | — | — | 53.4 | 51.9 | — | — |
| Example: | | | | | | |
| 1 F.surf. | 10.7 | 9.9 | 18.9 | 28.7 | 0.36 | 0.52 |
| G.surf. | — | — | 52.6 | 51.1 | — | — |
| 2 F.surf. | 10.6 | 11.7 | 17.4 | 39.1 | 0.33 | 0.71 |
| G.surf. | — | — | 53.5 | 52.0 | — | — |
| 3 F.surf. | 2.1 | 4.1 | 7.1 | 15.2 | 0.14 | 0.27 |
| G.surf. | — | — | 16.8 | 34.9 | 0.31 | 0.67 |
| 4 F.surf. | 8.7 | 9.6 | 13.8 | 32.2 | 0.26 | 0.58 |
| G.surf. | — | — | 53.4 | 52.1 | — | — |
| 5 F.surf. | 11.0 | 11.0 | 18.2 | 32.9 | 0.35 | 0.60 |
| G.surf. | — | — | 53.3 | 51.8 | — | — |
| 6 F.surf. | 11.2 | 9.8 | 20.4 | 27.8 | 0.39 | 0.50 |
| G.surf. | — | — | 53.1 | 51.8 | — | — |
| 7 F.surf. | 12.2 | 8.9 | 23.0 | 20.1 | 0.44 | 0.36 |
| G.surf. | — | — | 53.2 | 51.8 | — | — |
| 8 F.surf. | 12.4 | 10.5 | 24.6 | 29.7 | 0.47 | 0.54 |
| G.surf. | — | — | 53.2 | 51.9 | — | — |
| 9 F.surf. | 11.7 | 9.2 | 20.1 | 21.4 | 0.39 | 0.39 |
| G.surf. | — | — | 53.3 | 51.8 | — | — |
| 10 F.surf. | 11.8 | 10.3 | 23.4 | 30.9 | 0.45 | 0.56 |
| G.surf. | — | — | 53.0 | 51.7 | — | — |
| 11 F.surf. | 8.2 | 12.4 | 12.5 | 36.4 | 0.24 | 0.66 |
| G.surf. | — | — | 53.3 | 52.1 | — | — |

F.surf.: Film surface
G.surf.: Glass surface

TABLE 2

| | Incident on: | Haze value (%) | Level of change in haze value (%) |
|---|---|---|---|
| Comparative Example: | Film surface | 3.1 | — |
| Example: | | | |
| 1 | Film surface | 2.5 | −0.6 |
| 2 | Film surface | 2.9 | −0.2 |
| 3 | Film surface | 2.8 | −0.3 |
| 4 | Film surface | 3.0 | −0.1 |
| 5 | Film surface | 2.6 | −0.5 |
| 6 | Film surface | 2.2 | −0.9 |
| 7 | Film surface | 2.4 | −0.7 |
| 8 | Film surface | 2.6 | −0.5 |
| 9 | Film surface | 2.3 | −0.8 |
| 10 | Film surface | 2.3 | −0.8 |
| 11 | Film surface | 3.0 | −0.1 |

TABLE 3

Color System (D65 Light Source, 10° Visual Field)

| | Measurement conditions | c* |
|---|---|---|
| Example: | | |
| 1 | Film surface incident transmitted light | 9.0 |
| | Film surface incident reflected light | 4.5 |
| 2 | Film surface incident transmitted light | 16.5 |
| | Film surface incident reflected light | 9.4 |
| 3 | Film surface incident transmitted light | 9.2 |
| | Film surface incident reflected light | 0.3 |
| | Glass surface incident reflected light | 9.7 |
| 4 | Film surface incident transmitted light | 10.6 |
| | Film surface incident reflected light | 14.5 |
| 5 | Film surface incident transmitted light | 11.5 |
| | Film surface incident reflected light | 0.8 |
| 6 | Film surface incident transmitted light | 8.9 |
| | Film surface incident reflected light | 5.1 |
| 7 | Film surface incident transmitted light | 13.0 |
| | Film surface incident reflected light | 3.5 |
| 8 | Film surface incident transmitted light | 16.7 |
| | Film surface incident reflected light | 7.9 |
| 9 | Film surface incident transmitted light | 14.8 |
| | Film surface incident reflected light | 5.8 |
| 10 | Film surface incident transmitted light | 6.1 |
| | Film surface incident reflected light | 11.0 |
| 11 | Film surface incident transmitted light | 5.4 |
| | Film surface incident reflected light | 11.3 |
| Comparative Example: | | |
| | Film surface incident transmitted light | 13.0 |
| | Film surface incident reflected light | 3.7 |
| | Glass surface incident reflected light | 3.3 |

Confirmation (1) As can be confirmed from numerical values (0.14 to 0.47) of Examples shown in the column of "Degree of reduction of visible light reflectance" in Table 1, the visible light reflectance has greatly been reduced, compared with that of the Al vacuum-deposited semitransparent PET film according to Comparative Example on which no visible light absorbing film is formed, and it is confirmed that the glaringness is restrained which is caused by the reflection of visible light from the Al vacuum-deposited semitransparent PET film according to each Example on which the visible light absorbing film is formed.

As can also be confirmed from numerical values (0.27 to 0.71) of Examples shown in the column of "Degree of reduction of solar radiation reflectance" in Table 1, the degree of reduction of the same is 0.25 or more, and it is also confirmed that the heat insulating properties of the Al vacuum-deposited semitransparent PET film according to each Example on which the visible light absorbing film is formed can sufficiently function.

(2) Next, as can be confirmed from numerical values (−0.9 to −0.1) of Examples shown in the column of "Level of change in haze value" in Table 2, the haze value as well has greatly been improved, compared with that of the Al vacuum-deposited semitransparent PET film according to Comparative Example on which no visible light absorbing film is formed, and it is confirmed that the clear translucency of the Al vacuum-deposited semitransparent PET film according to each Example on which the visible light absorbing film is formed is also maintained.

(3) Further, as can be confirmed from numerical values of Examples shown in the column of chromaticness "c*" in Table 3, it is confirmed that, in the Al vacuum-deposited semitransparent PET film according to each Example, the color tone by no means comes too bright even where the visible light absorbing film is formed.

POSSIBILITY OF INDUSTRIAL APPLICATION

As described hereinbefore, according to the visible light absorbing film according to the present invention, having been formed on one side or both sides of the substrate which has solar radiation reflecting properties and whose visible light reflectance is 10% or more, and the structural member having this visible light absorbing film, the degree of reduction of visible light reflectance of the visible light absorbing film is 0.9 or less, and this reduces the reflection of visible light from the substrate to enable restraint of glaringness in the visible region. Also, the degree of reduction of solar radiation reflectance is 0.25 or more, and this retains the reflection of solar radiation from the substrate to enable the substrate to maintain even its heat insulating properties. Hence, these can be utilized as heat ray reflection type heat insulating materials which are superior in both design quality and heat insulating properties.

According to the visible light absorbing ink according to the present invention, the visible light absorbing film can be formed on one side or both sides of the substrate which has solar radiation reflecting properties and whose visible light reflectance is 10% or more. Hence, the ink can be utilized as a visible light absorbing ink when heat ray reflection type heat insulating materials are produced which are superior in both design quality and heat insulating properties.

The invention claimed is:

1. A laminate consisting of a heat ray reflection substrate having solar radiation reflectance of 55.3% or less and visible light reflectance of 10% or more to 53.4% or less, and a visible light absorbing film formed by a visible light absorbing ink having been coated on one side or both sides of said substrate, said ink containing fine particles which absorb visible-region light and transmit near-infrared-region light and infrared-region light, the laminate characterized in that:
the degree of reduction of visible light reflectance is 0.9 or less as defined by degree of reduction of visible light reflectance=[visible light reflectance (%) of the laminate after coating of the ink]/[visible light reflectance (%) of the substrate before coating of the ink]; and
the degree of reduction of solar radiation reflectance is 0.25 or more as defined by degree of reduction of solar radiation reflectance=[solar radiation reflectance (%) of the laminate after coating of the ink]/[solar radiation reflectance (%) of the substrate before coating of the ink];
said visible light absorbing ink contains at least one fine particles of a compound oxide selected from the group consisting of Cu—Fe—Mn, Cu—Cr, Cu—Cr—Mn, Cu—Cr—Mn—Ni, Cu—Cr—Fe and Co—Cr—Fe, titanium nitride, and titanium oxynitride, said fine particles having an average dispersed-particle diameter of 300 nm or less in the ink; and
the heat ray reflection substrate comprises: a semitransparent polyethylene terephthalate film having a surface which is uniformly vacuum-deposited with an aluminum thin film; or a composite comprising the semitransparent polyethylene terephthalate film having a surface which is uniformly vacuum-deposited with an aluminum thin film, and a glass plate.

2. The laminate according to claim 1, wherein, as a haze value measured according to JIS K 7105, the laminate having the visible light absorbing film formed on one side or both sides of the heat ray reflection substrate has a haze value which has been made lower than the haze value of the substrate before formation of the visible light absorbing film, or the laminate having the visible light absorbing film formed on one side or both sides of the heat ray reflection substrate has a haze value which has been made higher than the haze value of the substrate before formation of the visible light absorbing film and its gain is +3% or less.

3. The laminate according to claim 1, which has a value of 40 or less as chromaticness $c^*=[(a^*)^2+(b^*)^2]^{1/2}$ in the $L^*a^*b^*$ color system.

4. A structural member having a visible light absorbing film, characterized in that the laminate according to claim 1, 2, or 3 is incorporated directly or via an intervenient member or via a space.

5. The laminate according to claim 1, wherein said visible light absorbing ink contains as a binder component at least one inorganic high polymer, organic high polymer or inorganic-organic composite high polymer.

* * * * *